United States Patent
Jensen

(10) Patent No.: US 6,328,883 B1
(45) Date of Patent: Dec. 11, 2001

(54) FUEL FILTER ASSEMBLY WITH PRIMING PUMP

(75) Inventor: Russell D. Jensen, Modesto, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/583,957

(22) Filed: May 31, 2000

(51) Int. Cl.⁷ .................................................. B01D 35/153
(52) U.S. Cl. ....................... 210/136; 210/184; 210/416.4; 210/443; 137/541; 123/196 A
(58) Field of Search .................................... 210/110, 137, 210/136, 149, 184, 186, 232, 416.4, 440, 443, 444, 450; 137/540, 541; 123/196 A; 184/6.24

(56) References Cited

U.S. PATENT DOCUMENTS

| | | |
|---|---|---|
| Re. 29,447 | 10/1977 | Farrow et al. . |
| 1,407,763 | 2/1922 | Langston . |
| 1,468,906 | 9/1923 | Inman . |
| 1,746,336 | 2/1930 | Breer . |
| 1,789,611 | 1/1931 | Ranst . |
| 1,851,938 | 3/1932 | Rieke . |
| 2,071,529 | 2/1937 | Howard . |
| 2,098,102 | 11/1937 | McLean . |

(List continued on next page.)

FOREIGN PATENT DOCUMENTS

| | | |
|---|---|---|
| 824484 | 10/1969 | (CA) . |
| 1909130 | 2/1969 | (DE) . |
| 1915923 | 10/1970 | (DE) . |
| 1611162 | 9/1971 | (DE) . |
| 2456428 | 8/1976 | (DE) . |
| 0079841 | 5/1983 | (EP) . |
| 0164548 | 12/1985 | (EP) . |
| 0260069 | 3/1988 | (EP) . |

(List continued on next page.)

OTHER PUBLICATIONS

International Application Published Under the Patent Cooperation Treaty, International Publication No. WO95/00232.

Primary Examiner—Joseph W. Drodge
(74) Attorney, Agent, or Firm—Christopher H. Hunter

(57) ABSTRACT

A fuel filter comprises a filter head having an inlet and an outlet. A filter element is connectable to a nipple portion in the filter head. An actuating projection supported by the element is engageable with a valve element in the nipple portion to open flow through the nipple portion when the filter element is attached to the filter head. The filter head includes an annular threaded peripheral flange, and the element includes a corresponding annular threaded peripheral flange which together cooperate to secure the element to the head. A manual priming pump in the filter head includes a pair of check valves to control the flow of fluid through the head when priming the filter. A heater assembly includes a heater pan which encloses the heater elements and also includes the nipple portion, formed unitary therewith.

29 Claims, 9 Drawing Sheets

U.S. PATENT DOCUMENTS

| | | |
|---|---|---|
| 2,304,618 | 12/1942 | Williams . |
| 2,365,237 | 12/1944 | Allen . |
| 2,431,782 | 12/1947 | Walton et al. . |
| 2,496,688 | 2/1950 | Armstrong . |
| 2,533,266 | 12/1950 | Kovacs et al. . |
| 2,544,244 | 3/1951 | Vokes . |
| 2,642,187 | 6/1953 | Bell . |
| 2,729,339 | 1/1956 | McCoy . |
| 2,758,719 | 8/1956 | Line . |
| 2,937,756 | 5/1960 | Humbert, Jr. . |
| 2,979,208 | 4/1961 | Humbert, Jr. . |
| 2,998,138 | 8/1961 | Mould et al. . |
| 3,000,505 | 9/1961 | Scavuzzo . |
| 3,000,506 | 9/1961 | Hultgren . |
| 3,021,955 | 2/1962 | Joyce . |
| 3,029,836 | 4/1962 | Gruner . |
| 3,040,894 | 6/1962 | Pall . |
| 3,056,503 | 10/1962 | Roosa . |
| 3,070,232 | 12/1962 | Casaleggi . |
| 3,085,688 | 4/1963 | Eberle . |
| 3,105,042 | 9/1963 | Roosa . |
| 3,151,071 | 9/1964 | Kasten . |
| 3,198,336 | 8/1965 | Hyslop . |
| 3,216,571 | 11/1965 | Whiting, et al. . |
| 3,217,942 | 11/1965 | Humbert, Jr. et al. . |
| 3,232,437 | 2/1966 | Hultgren . |
| 3,242,437 | 3/1966 | Shiki . |
| 3,304,562 | 2/1967 | Schmidt . |
| 3,307,705 | 3/1967 | Halmenschlager . |
| 3,331,509 | 7/1967 | Gray, Jr. . |
| 3,363,762 | 1/1968 | Ensign . |
| 3,367,507 | 2/1968 | Hultgren . |
| 3,388,801 | 6/1968 | Boyd et al. . |
| 3,429,274 | 2/1969 | Nilsson . |
| 3,473,664 | 10/1969 | Hultgren . |
| 3,487,932 | 1/1970 | Forrester et al. . |
| 3,529,727 | 9/1970 | Bernhard . |
| 3,557,963 | 1/1971 | Offer . |
| 3,565,555 | 2/1971 | Akashi et al. . |
| 3,567,023 | 3/1971 | Buckman . |
| 3,589,517 | 6/1971 | Palnai . |
| 3,591,007 | 7/1971 | Crowther . |
| 3,608,726 | 9/1971 | Crowther . |
| 3,610,416 | 10/1971 | Otto . |
| 3,616,933 | 11/1971 | Baldwin . |
| 3,625,363 | 12/1971 | Eberle . |
| 3,677,412 | 7/1972 | Connor . |
| 3,685,658 | 8/1972 | Baldwin . |
| 3,719,281 | 3/1973 | Dieringer . |
| 3,726,403 | 4/1973 | Shaltis . |
| 3,875,651 | 4/1975 | LaCroce . |
| 3,931,011 | 1/1976 | Richards et al. . |
| 3,970,566 | 7/1976 | Rosaen . |
| 4,028,243 | 6/1977 | Offer et al. . |
| 4,035,306 | 7/1977 | Maddocks . |
| 4,038,189 | 7/1977 | Dison et al. . |
| 4,045,349 | 8/1977 | Humbert, Jr. . |
| 4,052,307 | 10/1977 | Humbert, Jr. . |
| 4,091,263 | 5/1978 | Richards et al. . |
| 4,094,791 | 6/1978 | Conrod . |
| 4,127,484 | 11/1978 | Walulik et al. . |
| 4,139,468 | 2/1979 | Rosaen . |
| 4,144,168 | 3/1979 | Thornton . |
| 4,168,237 | 9/1979 | Pickett et al. . |
| 4,169,058 | 9/1979 | Pickett et al. . |
| 4,237,015 | 12/1980 | Fearnhead . |
| 4,241,491 | 12/1980 | Hopp . |
| 4,246,109 | 1/1981 | Manders . |
| 4,253,954 | 3/1981 | Midkiff et al. . |
| 4,314,903 | 2/1982 | Hanley . |
| 4,324,660 | 4/1982 | Peyton et al. . |
| 4,331,537 | 5/1982 | Klauck . |
| 4,369,113 | 1/1983 | Stifelman . |
| 4,378,174 | 3/1983 | Hesse . |
| 4,400,864 | 8/1983 | Peyton et al. . |
| 4,424,007 | 1/1984 | Mehrens et al. . |
| 4,437,986 | 3/1984 | Hutchins et al. . |
| 4,485,011 | 11/1984 | Cole et al. . |
| 4,491,120 | 1/1985 | Hodgkins . |
| 4,500,425 | 2/1985 | Thornton et al. . |
| 4,507,199 | 3/1985 | Carlisle . |
| 4,508,621 | 4/1985 | Jackson . |
| 4,510,660 | 4/1985 | Hoeffken . |
| 4,522,712 | 6/1985 | Fischer et al. . |
| 4,539,108 * | 9/1985 | Izutani et al. ............ 210/184 |
| 4,617,116 | 10/1986 | Seiler . |
| 4,619,764 | 10/1986 | Church et al. . |
| 4,692,245 | 9/1987 | Church et al. . |
| 4,719,012 | 1/1988 | Groezinger et al. . |
| 4,724,074 | 2/1988 | Schaupp . |
| 4,732,671 | 3/1988 | Thornton et al. . |
| 4,740,299 | 4/1988 | Popoff et al. . |
| 4,743,374 | 5/1988 | Stifelman . |
| 4,832,844 | 5/1989 | Ayers . |
| 4,834,885 | 5/1989 | Misgen et al. . |
| 4,836,923 | 6/1989 | Popoff et al. . |
| 4,853,118 | 8/1989 | Brownell et al. . |
| 4,855,047 | 8/1989 | Firth . |
| 4,857,189 | 8/1989 | Thomson et al. . |
| 4,860,713 | 8/1989 | Hodgkins . |
| 4,906,365 | 3/1990 | Baumann et al. . |
| 4,948,505 | 8/1990 | Petrucci et al. . |
| 4,956,081 | 9/1990 | Hodgkins et al. . |
| 4,959,141 | 9/1990 | Anderson . |
| 4,969,944 | 11/1990 | Marechal et al. . |
| 4,971,528 | 11/1990 | Hodgkins et al. . |
| 4,976,852 | 12/1990 | Janik et al. . |
| 4,990,247 * | 2/1991 | Vandenberk ............ 137/541 |
| 4,997,555 | 3/1991 | Church et al. . |
| 5,017,285 | 5/1991 | Janik et al. . |
| 5,020,610 | 6/1991 | Lyon et al. . |
| 5,021,151 | 6/1991 | Yane . |
| 5,024,761 | 6/1991 | Deibel . |
| 5,030,345 | 7/1991 | Thomas . |
| 5,049,269 | 9/1991 | Shah . |
| 5,071,456 | 12/1991 | Binder et al. . |
| 5,080,787 | 1/1992 | Brown et al. . |
| 5,084,170 | 1/1992 | Janik et al. . |
| 5,098,559 | 3/1992 | Mack et al. . |
| 5,104,537 | 4/1992 | Stifelman et al. . |
| 5,112,478 | 5/1992 | Mohr . |
| 5,116,499 | 5/1992 | Deibel . |
| 5,118,417 | 6/1992 | Deibel . |
| 5,182,015 | 1/1993 | Lee . |
| 5,207,898 * | 5/1993 | Hodgkins . |
| 5,211,846 | 5/1993 | Kott et al. . |
| 5,231,967 | 8/1993 | Baltz et al. . |
| 5,244,571 | 9/1993 | Cburch et al. . |
| 5,300,223 | 4/1994 | Wright . |
| 5,301,058 | 4/1994 | Covington . |
| 5,312,546 | 5/1994 | Janik . |
| 5,362,390 | 11/1994 | Widenhoefer et al. . |
| 5,362,392 | 11/1994 | Jensen . |
| 5,395,518 | 3/1995 | Gulsvig . |
| 5,458,767 | 10/1995 | Stone . |
| 5,511,957 | 4/1996 | Tuckey et al. . |
| 5,529,689 | 6/1996 | Korin . |
| 5,547,572 | 8/1996 | Stone . |
| 5,622,623 | 4/1997 | Stone . |
| 5,643,446 | 7/1997 | Clausen et al. . |
| 5,698,093 | 12/1997 | Pyle et al. . |

| | | |
|---|---|---|
| 5,770,065 | 6/1998 | Popoff et al. . |
| 5,779,900 | 7/1998 | Holm et al. . |
| 5,779,903 | 7/1998 | Smith et al. . |
| 5,855,780 | 1/1999 | Dye et al. . |
| 5,904,844 * | 5/1999 | Stone ................................. 210/444 |
| 5,958,237 | 9/1999 | Cort et al. . |

FOREIGN PATENT DOCUMENTS

| | | |
|---|---|---|
| 0289188 | 11/1988 | (EP) . |
| 0426064 | 5/1991 | (EP) . |
| 0532161 | 5/1991 | (EP) . |
| 0483119 | 4/1992 | (EP) . |
| 686520 | 7/1930 | (FR) . |
| 570727 | 11/1961 | (FR) . |
| 2226199 | 11/1974 | (FR) . |
| 2327812 | 11/1975 | (FR) . |
| 1075424 | 7/1967 | (GB) . |
| 1254274 | 11/1971 | (GB) . |
| 333469 | 12/1935 | (IT) . |
| 46-14715 | 5/1971 | (JP) . |
| 47-2087 | 1/1972 | (JP) . |
| 47-34410 | 10/1972 | (JP) . |
| 48-14230 | 5/1973 | (JP) . |
| 52-50364 | 4/1977 | (JP) . |
| 53-163780 | 12/1978 | (JP) . |
| 54-37966 | 3/1979 | (JP) . |
| 63-7285 | 5/1983 | (JP) . |
| 61-53564 | 4/1986 | (JP) . |
| 5-23506 | 2/1993 | (JP) . |

* cited by examiner

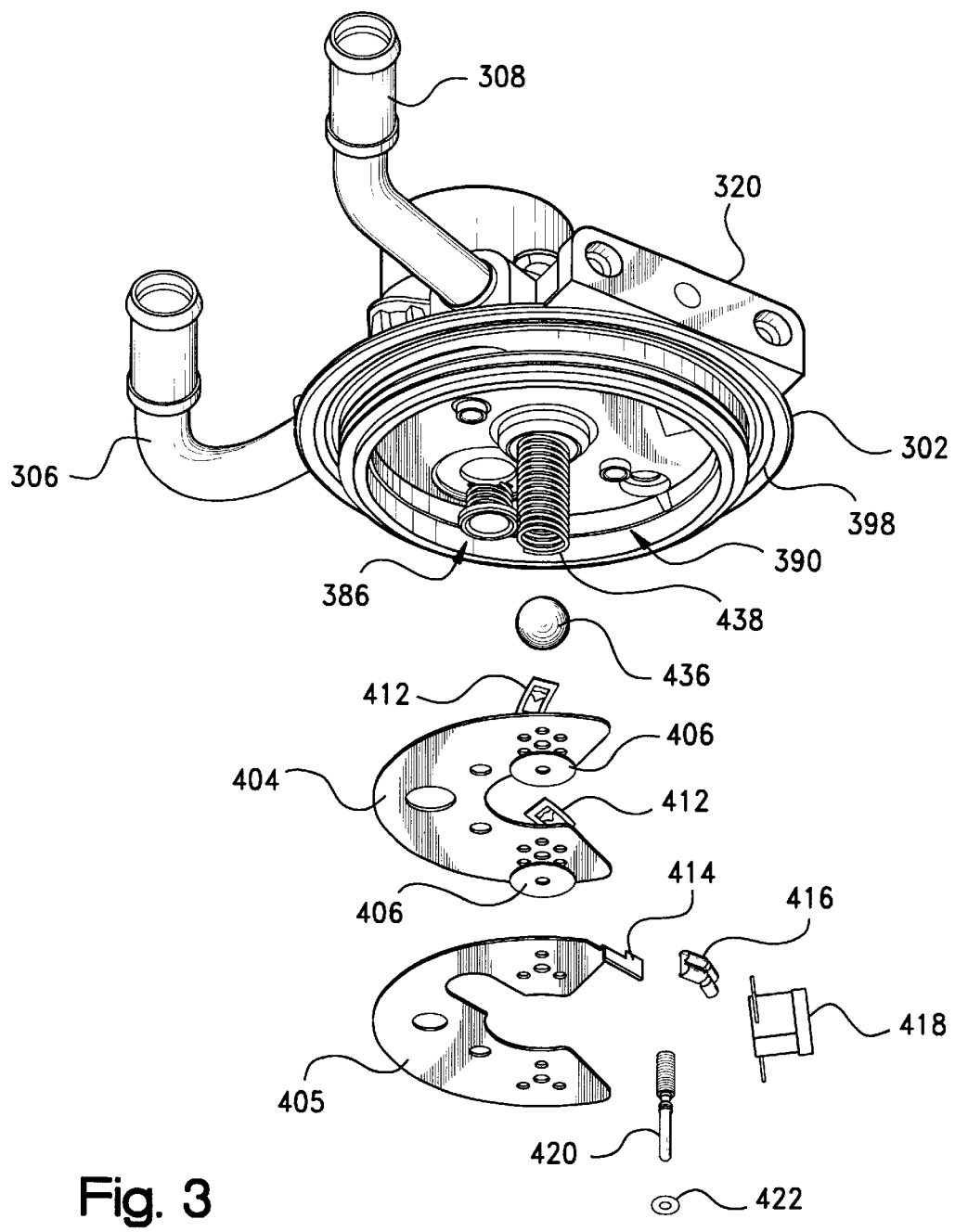
Fig. 3
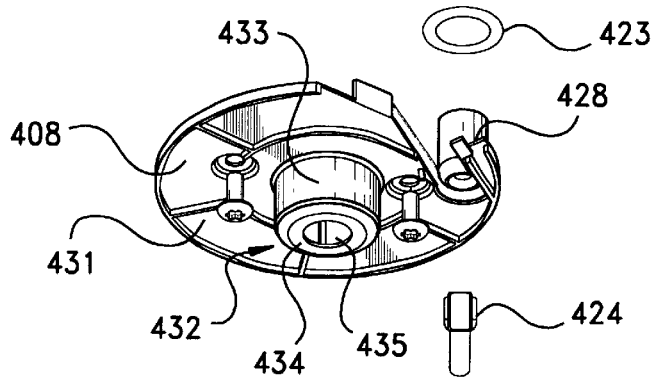

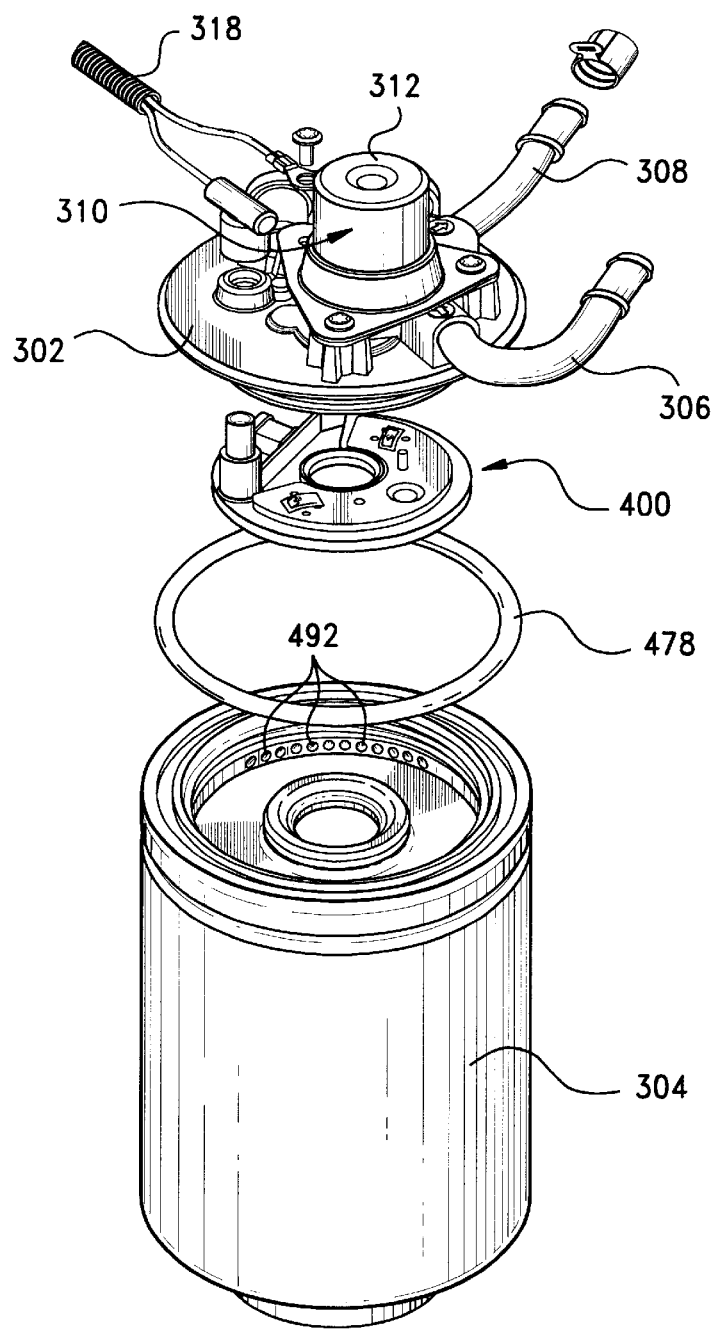
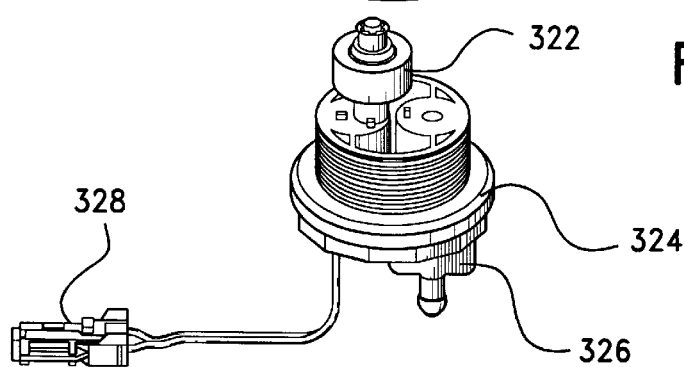
Fig. 6

FUEL FILTER ASSEMBLY WITH PRIMING PUMP

FIELD OF THE INVENTION

This invention relates to fluid filters, and more particularly to fuel filters for vehicles.

BACKGROUND OF THE INVENTION

Many types of fuel filters (also known as "separators") are known in the prior art. A popular type of filter construction is a type that has a filter head to which a replaceable "spin-on" element is attached. The head is a permanent part of the fuel system of the vehicle and includes inlet and outlet connections to the fuel lines. The filter element may be readily removed from the filter head and a new one attached without removing the filter head from the fuel line connections.

One problem associated with filters, and particularly filters for diesel fuel, is that during cold starting conditions, the fuel can have a low viscosity—making it difficult for the fuel to pass through the filter. The cold fuel can also wax or plug the filter media. This is a well-known issue, and many devices have been developed in an attempt to solve this. For example, one fuel filter includes a heater provided internally of the filter housing to heat the fuel and the media as the fuel passes through the filter (see, e.g., Stone, U.S. Pat. No. 5,547,572). While such heaters help solve the problem of waxing or plugging, it is believed that many such heaters have been relatively complex assemblies with a number of components that are sometimes difficult to assemble. It is therefore believed there is a need for heaters that are simple to manufacture and assemble, and yet which are still efficient, reliable, and long-lasting.

Another problem is that elements with different efficiencies, applications, and/or qualities can sometimes fit on the same filter head. Periodic replacement of the element is necessary such that the filter element will not become so loaded with impurities that fuel flow is restricted. Replacing the element also ensures that impurities are removed from the fuel before it is delivered to downstream components such as fuel injection pumps and fuel injectors, where such contaminants may cause damage. It is important to replace a spent element with the same type of element. It is also important to run the filter with an element installed. Using the wrong type of element or failing to use any element can allow damage to occur to the downstream components. Certain elements have been designed whereby the element can only fit a certain filter head, and where the filter will not operate without such a filter element installed (see, e.g., Clausen, U.S. Pat. No. 5,643,446). While this has provided some protection, it is believed that there is still a need for simple, compact, easy to assemble elements that can only be used with a specific filter head, and where the filter will not operate without a filter element installed.

A still further problem arises when a fresh element is installed on the filter head. When the spent element is removed, the element is filled with fuel. The fresh element, when it is installed, is not. Therefore, the new element introduces an air pocket into the system. The air pocket may prevent fuel flow if fuel is drawn through the head and element by vacuum produced by a downstream fuel pump. A large slug of air in the system may also cause damage to downstream components such as an injector pump or fuel injectors.

It is known to install a priming pump on the filter head to eliminate the air pocket. The pump is actuated by alternatingly depressing and releasing a pump cap on the filter head. One type of priming pump is located in the fluid flow path between the inlet to the head and the in-flow area of the filter element, with a pair of spherical valve elements controlling the flow of fuel through the head (see, e.g., Jensen, U.S. Pat. No. 5,362,392). This type of pump is reliable, but has flow passages that require careful manufacturing so that the passages are maintained within close tolerances. The passages are also somewhat complicated to manufacture, which adds to the overall cost of the pump. It is therefor believed there is also a need for a filter head with a manual priming pump that is simple to manufacture and assemble, and yet is still reliable.

As such, it is believed there exists a need for an improved filter head, and filter element therefor, that overcomes the drawbacks identified above.

SUMMARY OF THE PRESENT INVENTION

A new and unique fuel filter is provided which includes a filter head and a replaceable filter element. The filter head has an integral priming pump that is simple to manufacture and assemble, and is reliable in operation. The head also has an integral heater that is compact and simple in design and provides efficient, reliable and long-lasting operation. The filter element is simple, compact, and easy to assemble, and can only be used with a specific filter head.

According to a preferred embodiment of the invention, the priming pump of the filter head includes a spring-biased pump cap moveably located over a pump guide. Fluidly-interconnected first, second and third chambers are provided in the filter head, with the pump cap and pump guide forming a portion of the second, intermediate chamber. A first spring-biased check valve is located between the first and second chambers, and permits fuel flow from the inlet of the filter head into the first chamber, and then to the second chamber. A second spring-biased check valve is located between the second and third chambers in the filter head, and allows fuel to flow from the second chamber to the third chamber and then out to the filter element. A heater assembly is received in the third chamber. The fuel is warmed as it passes over the heater assembly and into the filter element.

The heater assembly includes at least one heater plate, and a non-conductive heater pan enclosing the heater plate in the third chamber. The heater pan includes a disk-shaped body and a unitary nipple portion. The nipple portion includes a cylindrical wall extending away from the head and terminating in a radially-inward directed annular portion defining a central opening. A spherical valve member is carried in the nipple portion and spring-biased to a closed position against the central opening. The integral heater is compact and simple in design and provides efficient, reliable and long-lasting operation.

The filter element includes a cylindrical housing enclosing a ring-shaped filter media. The upper end cap of the media includes an annular body portion bonded to one end of the media, and an annular threaded flange portion. The annular flange portion bounds the periphery of the annular body portion, and projects axially upward therefrom. The housing is secured to the media by forming an open end of the housing around the flange portion. A series of holes are formed in the flange portion of the upper end cap, between the threads and the body portion, to allow the fuel to pass radially outward through the flange into a peripheral fuel cavity surrounding the filter media. The filter head includes an annular threaded flange projecting downwardly from the lower surface of the filter head, which cooperates with the flange of the element to allow the element to be screwed onto and off of the filter head. The flange on the filter element carries an O-ring for sealing against the lower surface of the filter head.

The upper end cap of the filter media further has a first annular end cap wall which bounds the inner diameter of the annular body portion, and projects axially inward therefrom. A central portion with fluid passages therethrough transversely spans the annular end cap wall. A central actuating projection extends axially upward from the central portion and is preferably formed unitary with the central portion. The annular end cap wall portion of the end cap accepts the nipple portion when the element is attached to the filter head, with the central actuating projection engaging the spherical valve member of the nipple portion. An annular seal is carried by the upper end cap for sealing against the nipple portion. The element is simple, compact and easy to assemble.

Attachment of the element to the head causes the actuating projection to move the valve element to an open position. This enables fuel to flow out of the filter element to the outlet of the filter head. Disengagement of the element causes the valve element to move to the closed position so that air may not readily enter the head or the remainder of the fuel system. Further, the closure of the valve element prevents fuel from flowing out of the head through the nipple portion.

The actuating member is sized and positioned longitudinally so that the actuating member inside the element engages and opens the valve element in the nipple portion when the element is attached to the head. The actuating member may be positioned within various element types at different longitudinal positions, each of which corresponds to a particular configuration of a nipple portion. As a result, only a proper filter element will operate in conjunction with the filter head, and conversely, the filter head will not operate without a filter element attached.

When the pump cap is depressed, pressure is applied in the second chamber, the first check valve in the body moves adjacent to the first seat and blocks flow between the first and second chambers. The pressure in the second chamber forces the second check valve off its seat and fuel flows from the second chamber to the third chamber that results in the delivery of fuel to the filter element. When the pump cap is released, a vacuum is applied to the second chamber, which causes the second check valve to close, and the first check valve to open and draw fuel into the second chamber. This process is repeated with each cycle of the pump until all the air is forced out of the element. The air passes out of the element through a vent in the head, or in some systems may be forced out through an outlet of the filter head and moved to a point downstream where it does not impair operation of the fuel system. The priming pump is simple to manufacture and assemble, and reliable in operation.

After the priming operation is complete, the engine of the vehicle on which the fuel filter is installed may be started and flow commenced through the filter head and the element. As fuel is drawn into the inlet of the head, both check valves in the filter head move off their associated seats to enable flow to the element. The check valves are sized so as to pose minimal restriction to flow through the filter head. The fuel then passes over the heater assembly and is heated. The fuel is then filtered through the element, and directed back through the outlet of the filter head to the downstream components.

Further features and advantages will be apparent upon reviewing the following Detailed Description of the Preferred Embodiment and the appended Drawings.

BRIEF DESCRIPTION OF THE DRAWINGS

FIG. 3 is a partially assembled view of the filter head, showing the components of the heater assembly.

FIG. 6 is a partially assembled view of the filter head and filter element assembly.

DETAILED DESCRIPTION OF THE PREFERRED EMBODIMENT

Figure 1:
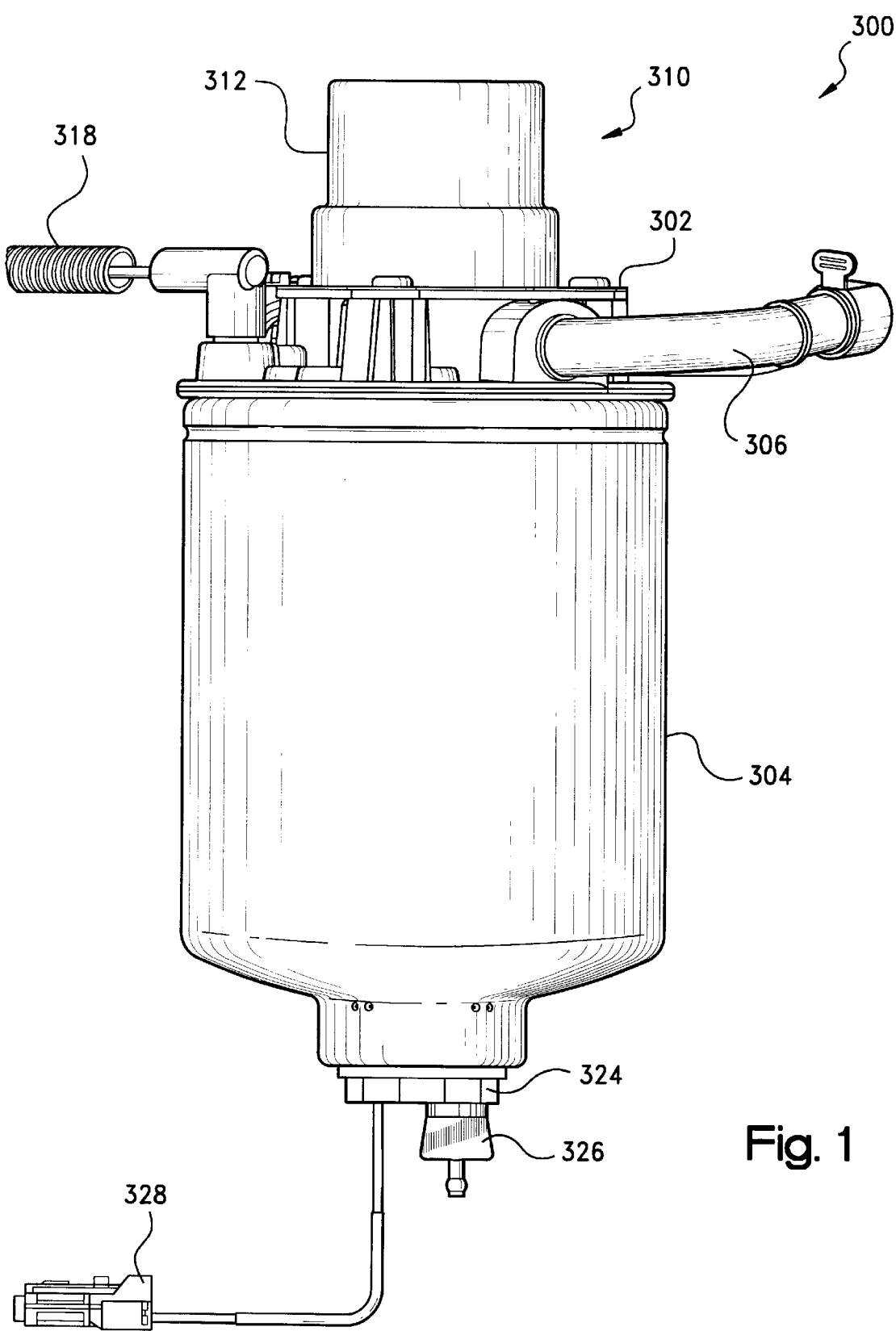
FIG. 1 is a front view of the filter head and filter element assembly constructed according to a preferred embodiment of the present invention.
Figure 2:
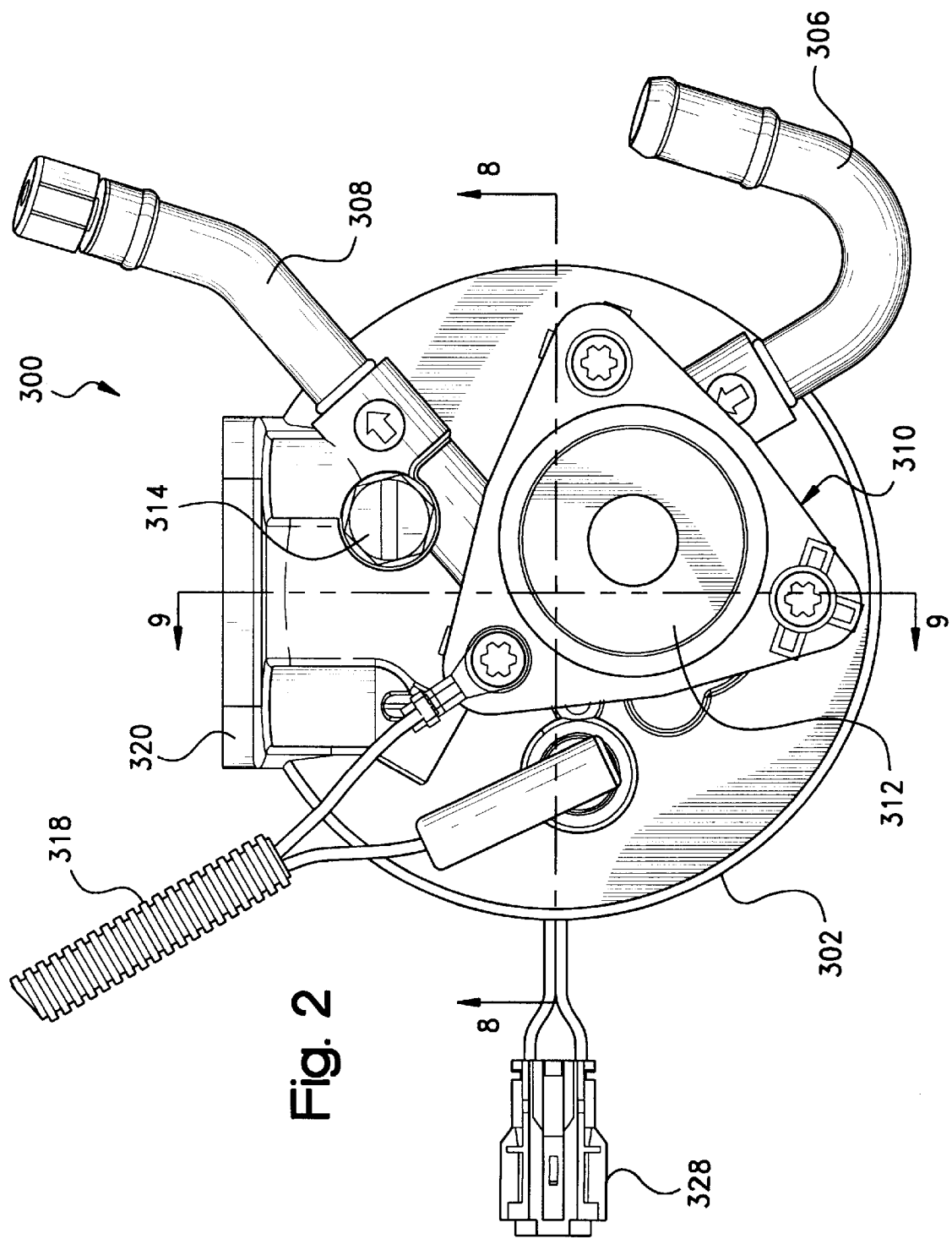
FIG. 2 is a top view of the filter head and filter element assembly of FIG. 1.

A preferred embodiment of the present invention is shown in FIGS. 1–10. Referring first to FIGS. 1 and 2, a fuel filter assembly constructed according to the preferred embodiment is indicated generally at 300. Filter assembly 300 includes a filter head 302 and a detachable filter element 304. The head includes an inlet 306 and an outlet 308. The head also includes a priming pump, indicated generally at 310, which includes a movable plastic, cup-shaped pump cap 312. The head further includes a body 305 with a vent opening (not shown) which in operation is generally closed by a removable vent plug 314. The head 302 also includes an electrical connector 318 for connection to a fuel heater inside the head. The filter head further includes a mounting plate 320 to facilitate mounting the filter head on a vehicle.

Figure 8:
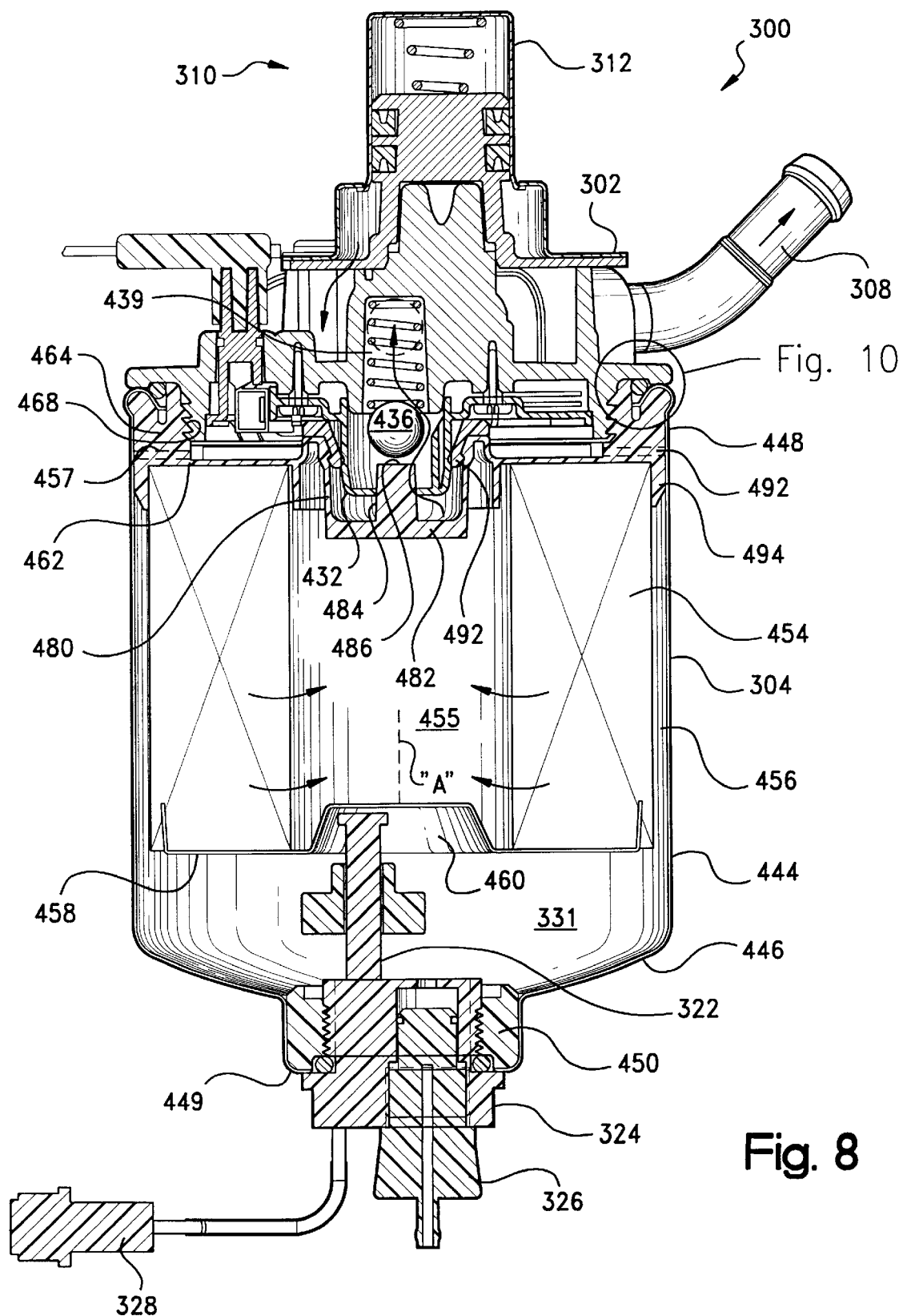
FIG. 8 is a cross-sectional side view of the filter head and filter element assembly taken substantially along the plane described by the lines 8—8 of FIG. 2.

Element 304 has a removable bottom cap 324, a drain valve 326 and an electrical connector 328 for a water sensor 330 (see FIG. 6) extending from bottom cap 324. Water sensor 330 and drain valve 326 operate to sense and allow drainage of water collecting in contaminant collection chamber 331 (FIG. 8).

Figure 4:
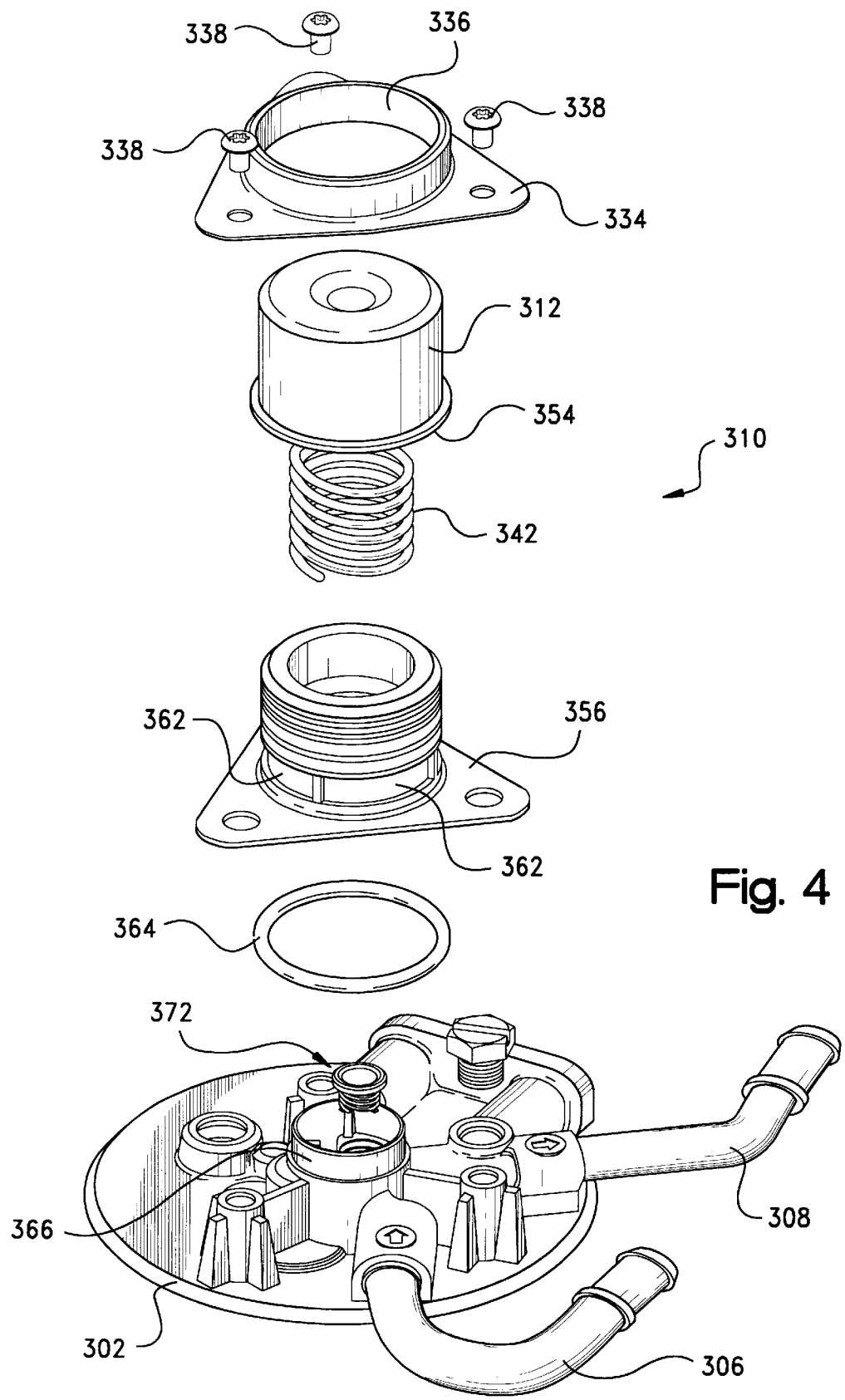
FIG. 4 is a partially assembled view of the filter head, showing the components of the pump assembly.
Figure 5:
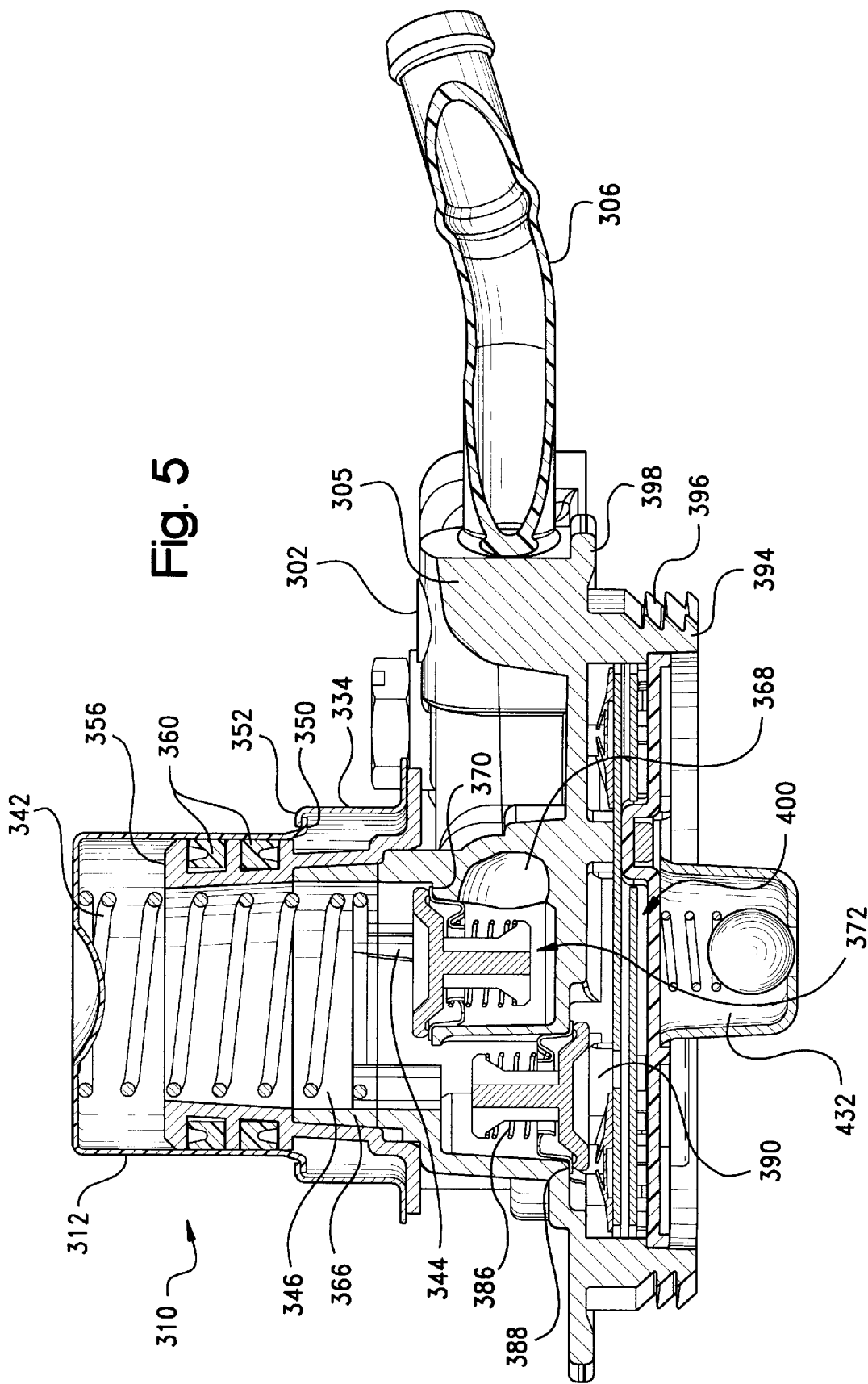
FIG. 5 is a cross-sectional side view of the filter head of FIG. 1.
Figure 10:
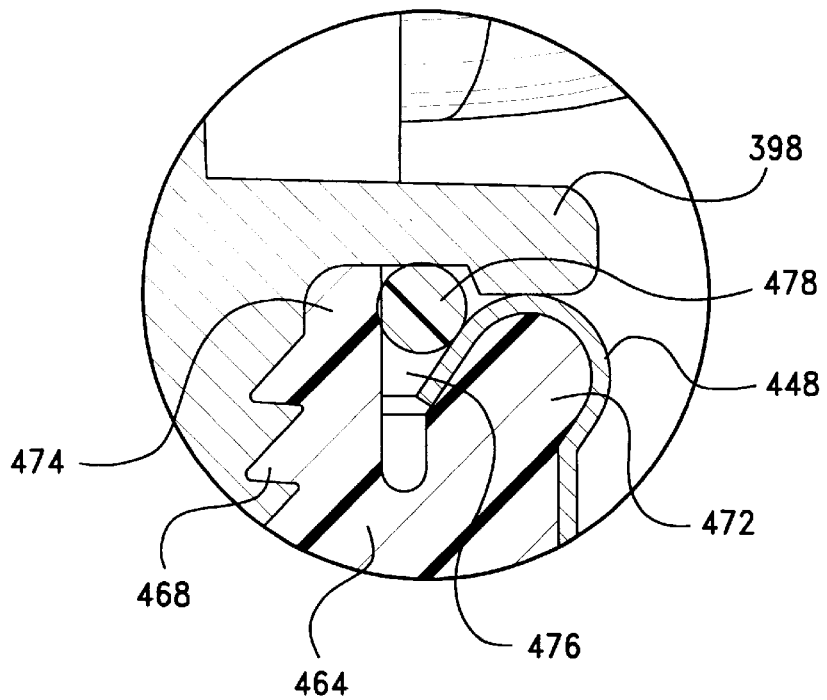
FIG. 10 is a cross-sectional enlarged side view of a portion of the filter head and filter assembly of FIG. 8.

Head 302 and priming pump 310 are shown in detail in FIGS. 3–7. As best shown in FIGS. 4 and 5, the priming pump 310 has a pump retainer 334 with a central opening 336 to receive pump cap 312. Retainer 334 is secured to filter head 302 with fasteners 338. A spring 342 internal to cap 312 is located against flanges 344 in a second chamber 346 of head 302, and urges cap 312 outwardly (upwardly), away from the filter head. Cap 312 has a radially-outward projecting annular flange 350 at its inner end, which engages a radially-inward projecting annular flange 352 of pump retainer 334, to limit the maximum outward movement of cap 312. Cap 312 is received around a pump guide 356, which is also attached to filter head 302 through fasteners 338. A pair of annular wiper seals 360 are located in grooves in guide 356 to maintain a fluid-tight seal with cap 312 as the cap moves. Openings 362 are provided toward the inner end of guide 356. An annular gasket 364 is provided between guide 356 and an annular portion 366 of head 302, to provide a fluid-tight seal therebetween.

A first chamber 368 is provided between inlet 306 and second chamber 346, and initially receives fuel from inlet 306. A seat 370 is defined between first chamber 368 and second chamber 346, and a first check valve, indicated generally at 372, is located on seat 370. Check valve 372 allows fuel to flow from first chamber 368 to second chamber 346, but prevents flow in the reverse direction.

Figure 7:
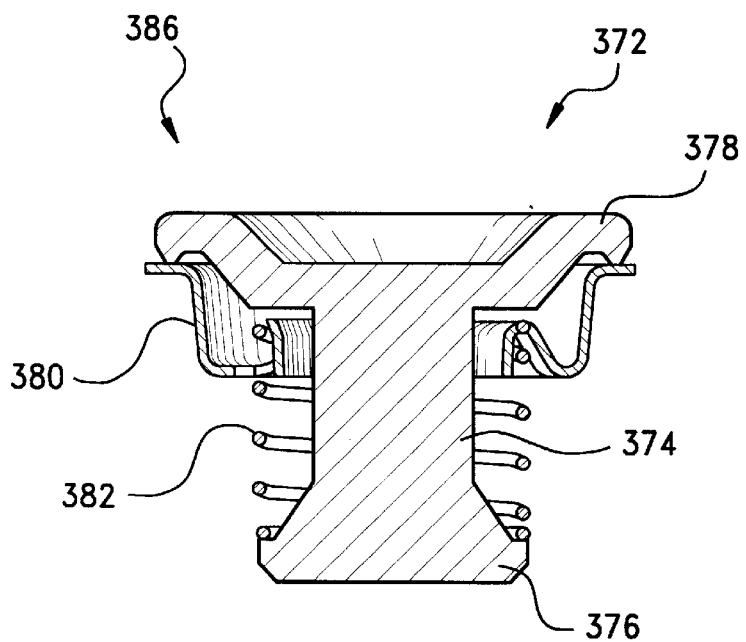
FIG. 7 is a cross-sectional enlarged side view of the check valve for the filter head of FIG. 1.

As shown in FIG. 7, check valve 372 includes a central, cylindrical valve body 374 with a radially-outward projecting base 376 at one end, and a radially-outward projecting head 378, at the other end. An annular valve retainer 380 is received about the valve body. Retainer 380 fits closely and securely in valve seat 370 in filter head 302 (such as by friction fit), and serves as an upper stop for spring 382. Spring 382 extends between retainer 380 and base 376, and when check valve 372 is installed within valve head 302, spring 382 urges valve body 374 into a position against valve seat 370. Flow from second chamber 368 into first chamber 368 is allowed when the fluid pressure is above the force of the spring (which is very low, for low pressure drop), but flow in the opposite direction is prevented.

A second check valve, indicated generally at 386, is also provided in filter head 302. A second valve seat 388 is provided between second chamber 368 and a third chamber 390 in head 302. Check valve 386 preferably has the same structure as check valve 372, and is secured within valve seat 388 (such as with friction fit). When check valve 386 is installed within valve head 302, check valve 386 allows fuel flow from second chamber 368 into third chamber 390, but prevents flow in the opposite direction.

Figure 9:
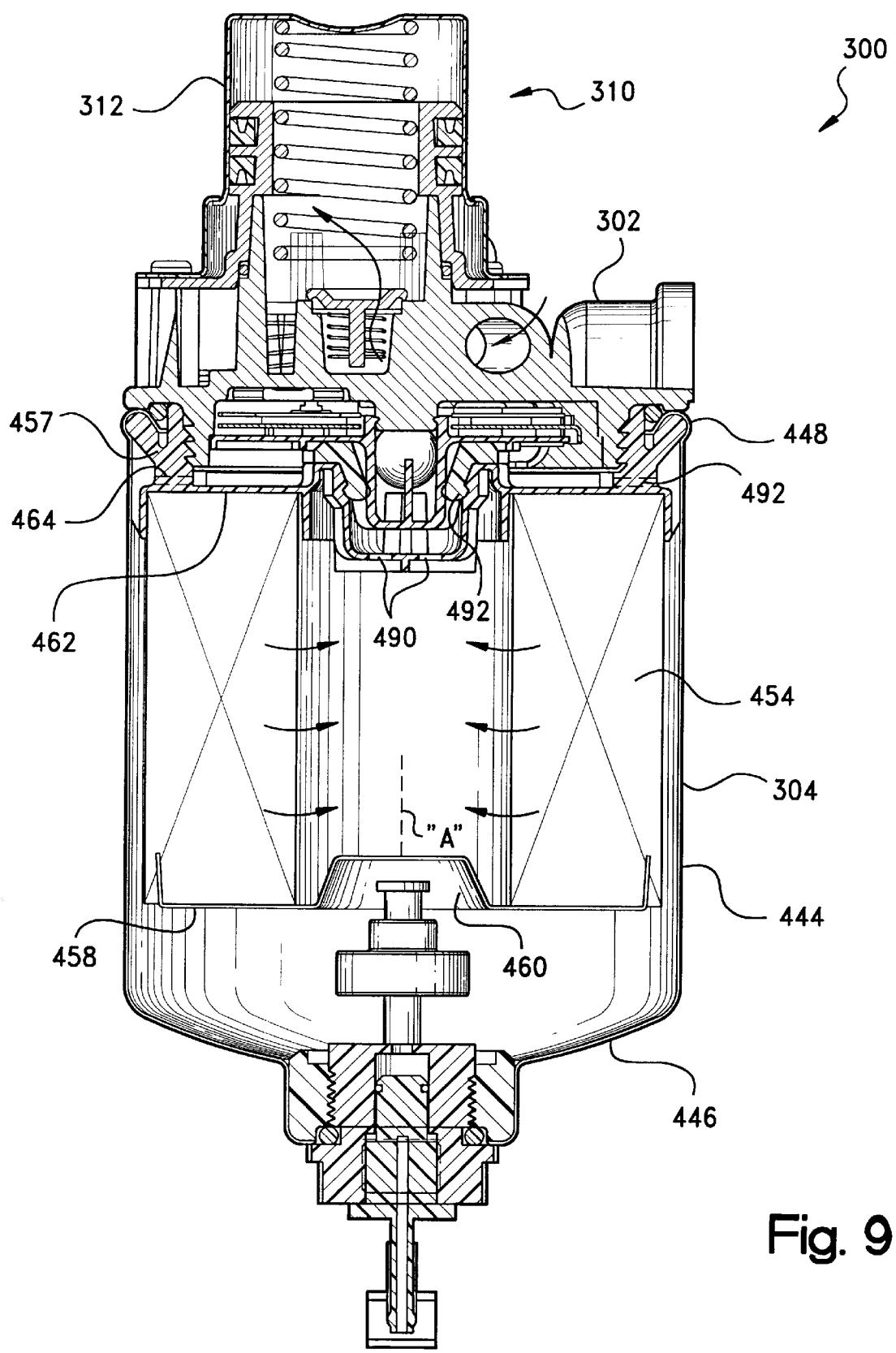
FIG. 9 is a cross-sectional side view of the filter head and filter element assembly taken substantially along the plane described by the lines 9—9 of FIG. 2.

The operation of the priming pump will now be briefly described. Pumping action is initiated by alternately depressing and releasing pump cap 312. When cap 312 is depressed, as shown in FIGS. 5, 8 and 9, the pressure generated inside the cap by the decrease in volume of the variable volume area 346 is applied against the first check valve 372 to keep the first check valve seated against the first value set 370. The increased pressure also forces the second check valve 386 (downwardly) off its valve seat 388, and forces fuel in second chamber 346 into third chamber 390, and into the attached filter element.

In the third chamber the fuel may be heated if the heater 400 is operating. However, regardless of whether the fuel is heated, the fuel flows through the third chamber to a peripheral chamber of the filter element.

When pump cap 312 is released from its lower position, it is moved upward by the force of spring 342. This upward movement increases the volume of chamber 346 inside the cap and creates a vacuum. The vacuum is transmitted to second chamber 346 and to first check valve 372, which is moved (upwardly) off its seat 370. In this condition check valve 386 remains seated due to the vacuum force on its upper side.

The vacuum applied to the second chamber 346 pulls fuel into the second chamber from the first chamber 368 and the inlet 306. When the vacuum is dissipated the pump is again depressed to repeat the cycle, until fuel completely fills the filter element and head.

In some systems, when there has been an element change the vent plug 314 is removed and the priming pump cycled until the new element is filled with fuel and all air in the new element has been displaced and pushed out the vent opening. Thereafter the vent plug is reinstalled. This minimizes the amount of air that may enter the system and avoids possible problems with restarting the engine after a filter change.

When the filter is primed the engine may be started. If the fuel is drawn through the element and filter head by vacuum, the incoming fuel will pass into the inlet 306 of the head and through chambers 368, 346 and 390. In this condition both check valves 372 and 386 are disposed upward from their respective seats to enable fuel flow through the head. This enables fuel to flow in the annular clearances between the bodies of the check valves and the walls defining the valve seats. The check valves are sized such that they provide a relatively large flow area between the periphery of the bodies and the walls so that restriction to flow is minimized.

As should be appreciated, the check valve 372, 386, the valve seats 370, 388, and the chambers 368, 346 and 390 in filter head body 305 are relatively straight forward to manufacture and assemble, and have relatively relaxed tolerance requirements because of the use of retainer 380.

An annular flange 394 is formed unitary with, and projects outwardly (downwardly) from the filter body 305. Flange 394 includes outwardly directed threads, as at 396. Flange 394 bounds the third chamber 390 and is disposed toward the periphery of head 305. An annular lip 398 projects radially outward above the threaded portion 396 of the flange.

A heater assembly, indicated generally at 400, is located in third chamber 390. As shown in FIG. 20, heater assembly 400 includes a pair of C-shaped heat sinks 404, 405 between which a pair of disk-shaped PTC heater elements 406 are located. A heater pan 408 encloses heat sinks 404, 405 and heater elements 406 in chamber 390. Fasteners 410 secure the heater pan 408, heat sinks 404, 405 and heater elements 406 together and against the filter head body 305. Push-on nuts 412 are provided to hold the heater pan, heat sinks and heater elements together prior to being secured to body 305 (see FIG. 6). Inner heat sink 405 includes a blade 414 that receives one end of terminal 416. The other end of terminal 416 is plugged into a blade of thermostat 418. Another blade of thermostat 418 is in electrical contact with contact pin 420, which extends through pan 408. O-rings 422 and 423 are received around contact pin 420 and provide a fluid-tight seal with pan 408. A terminal 424 is provided externally of pan 408 to provide an electrical contact point for electrical connector 318 (FIG. 1).

As can be seen in FIG. 3, pan 408 has a cut-out portion 428, which allows fuel in third chamber 390 to pass around the heater elements and heat sinks of the heater assembly, and into the filter element.

Heater pan 408 includes a disk-shaped central body 431 which is closely received in heater chamber 390, and a cup-shaped nipple portion, indicated generally at 432. Nipple portion 432 has a cylindrical wall 433 which extends axially inwardly (downward) from body 431, and terminates in a radially-inward projecting annular portion 434 defining a central circular opening 435. A spherical valve member 436 is received in the cup-shaped nipple portion 432, and is biased against opening 435 by spring 438. Spring 438 extends between an inner wall of a fourth chamber 439 and valve member 436, and normally retains valve member 436 sealed against opening 435 to prevent flow through the nipple portion. Fourth chamber 439 is in fluid communication with outlet 308 to allow flow from the element to pass out of the filter head. As should be appreciated, the integral heater is compact and simple in design, and provides efficient, reliable and long-lasting operation. Heater pan 408 is preferably formed from a temperature-resistant, non-conductive material (e.g., plastic), using an appropriate technique, such as molding, such that nipple portion 432 is formed unitary, in one piece with body 431.

Referring now to FIGS. 8 and 9, filter element 304 includes an outer cylindrical canister or housing 444 with an integral (preferably unitary) lower end wall 446, and an open upper end 448. Lower end wall 446 includes a central circular opening 449, and a ring-shaped member 450 is supported in opening 449. Lower end wall 446 can be crimped or otherwise formed around ring-shaped member 450 to retain the ring-shaped member on the housing 444. Ring shaped member 450 includes internal threads to receive removable bottom cap 324.

A ring-shaped filter media 454 circumscribing a central axis "A" is received within housing 444, with a central fuel cavity 455 defined internally of the filter media, and a peripheral fuel cavity 456 defined between the filter media and housing 444. Ring-shaped filter media 454 can be formed of any material appropriate for the particular application. First and second (upper and lower) end caps 457, 458, are fixed to each end of the filter media. Second end cap 458 is completely closed across the diameter of the end cap, and includes a well area, at 460, which receives water sensor 322.

First end cap 457 includes an annular body portion 462, preferably adhesively bonded to the end of the media, and an annular flange, at 464, projecting axially outward (upward) from the outer (upper) surface of the end cap. Annular flange 464 is located toward the periphery of the end cap, and preferably outwardly bounds the end cap. Annular flange 464 includes inwardly directed threads, as at 468, which cooperate with outwardly directed threads 396 (FIG. 5) of annular head flange 394, to removeably attach the filter element to the filter head. As shown in detail in FIG. 10, the open end 448 of the housing is formed (e.g., mechanically bent) around a radially-outer branch 472 at the upper end of flange 464, to secure the filter media in a fluid-tight manner to the housing. A radially-inner branch 474 of the flange 464 includes threaded portion 468, and together with outer branch 472, defines an annular channel 476 opening outwardly from the end of the filter element. An annular O-ring 478 is located in the channel, and provides a seal between the filter element 304 and the annular lip 398 of the filter head.

Referring again to FIG. 8, the first end cap 457 includes an axially inwardly-extending annular wall 480. Annular wall 480 is radially disposed inwardly from media ring 454. A central, radially-projecting disk-shaped portion 482 spans the internal end of wall 480 of the first end cap. An actuating projection 484 extends axially outward (upward) from the central portion 482. The actuating projection 484 has a base end fixed (preferably unitary with) central portion 482, away from first end cap 451, and a free end 486 which is positioned axially toward first end cap 457, but preferably inward from the annular body portion 462. The central projection preferably has an X-shape in cross section, although other geometries are possible. The central portion 482 includes a plurality of fluid passages 490 (FIG. 9) preferably spaced around projection 484. Preferably, four such fluid passages are provided, however any number (and dimension) of fluid passages can be provided depending upon the desired fuel flow. The fluid passages 490 enable fluid to pass through the first end cap in the recessed area bounded by wall 480.

A resilient seal 492 bounds the inner diameter of annular wall 480, and is retained to the first end cap. The seal 492 has a dimension that seals against nipple portion 432 when the element is installed on the filter head.

The first end cap 457 further includes a plurality of generally radially extending and circumferentially-spaced openings 492 (see also, FIG. 6). The openings 492 are located axially between the threaded portion of 468 of annular flange 464 and annular portion 462, and direct fuel radially outward into the peripheral cavity 493 surrounding media 454. Openings 492 are preferably cylindrical bores formed (by, e.g., drilling) through the flange, however, the dimension (and number) of openings can vary depending upon the desired fuel flow. End cap 457 can have a short skirt 494 depending downwardly and outwardly surrounding a portion of the media 454, which includes axial ribs (not shown) defining openings for fuel to flow into the peripheral cavity 456. As should be appreciated, element 304 is simple, compact and easy to assemble.

As shown in FIG. 25, when the element 304 is engaged to the head 302, the threaded portion 468 of the element flange 464 engages the threaded portion 396 of flange 394 in the filter head 302 to securely hold the element to the head. When the element is engaged to the head, the seal 492 engages the interiorly extending area of nipple portion 432 to provide a leak resistant connection with the central fuel cavity 455. Further, the free end 486 of actuating projection 484 is positioned to engage valve element 436 and move it away from opening 435 (FIG. 3) to enable fluid to flow through opening 435 from the central fuel cavity 455 of the element. The flow easily passes between opening 435, and the X-shaped structure of central projection 484. This enables the central fuel cavity 455 of the element to be in fluid connection with the outlet 308 of the filter head.

With element 304 attached to the head by engagement between the nipple portion and the annular flange, seal 478 (FIG. 10) engages the lip 398 of filter head body 305 in fluid-tight relation. This provides a fluid-tight region between the nipple portion 432 and seal 478. Fuel that passes out of the head through the third chamber 390, passes through openings 492 in flange 457, and into the peripheral fuel cavity 493 between the media 454 and the housing 444. Contaminants that collect on the surface of the media in the peripheral fuel chamber can fall downward in the housing and collect in contaminant collection area 331 in the lower portion of the housing. Fuel then passes in an outside/in fashion through the media 454 and is filtered before it reaches the outlet 308.

The actuating projection 484 and valve element 436 function to close off any flow through the nipple portion when the element is removed. As a result, fuel spillage is minimized. Further, this feature minimizes the amount of air that gets into the system, and prevents the filter from operating without any element attached.

A further advantage of the construction shown is that the actuating projection 484, the nipple portion 432 and valve element 436 must have a proper mating relationship to enable the filter element to be engaged with the head and to work properly in conjunction therewith. This is important when the filter element configuration is similar for different types of fuel filter/separator elements, many of which would not be suitable for the particular application. By varying the longitudinal position of the actuating member and the length of the nipple portion extending into the central fuel chamber of the element so that each corresponds only for the proper filter type, it may be assured that only the correct filter element is installed on the head.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filter element, comprising:
a ring-shaped filter media circumscribing a central axis and having first and second ends,
a housing receiving said filter media ring, said housing including a closed end and an open end, the first end of the filter media ring being located toward the open end of the housing, and the second end of the filter media ring being located toward the closed end of the housing,
an end cap attached to the first end of the filter media ring, the end cap including an annular body portion bonded to the filter media ring, and an annular flange unitary with the annular body portion and extending axially outward away from the end cap, and located toward the periphery of the end cap, said annular flange including a threaded portion to enable the filter element to be removeably connected to a corresponding threaded portion of a filter head, and generally radially-extending openings in the annular flange between the threaded portion and the annular body portion to enable fluid flow through the annular flange, and a central portion spanning the annular body portion and having flow openings to enable flow through the central portion, said central portion supporting a central projection, said central projection having a base end supported interiorly of the media ring and located away from said end cap and extending axially from said base end to a distal end located toward the end cap.

2. The filter element as in claim 1, wherein the open end of the housing is secured to the annular flange.

3. The filter element as in claim 2, wherein the open end of the housing is mechanically formed around the flange.

4. The filter element as in claim 1, and further including an annular seal carried by and inwardly bounding the annular body portion of the end cap.

5. The filter element as in claim 1, and further including an annular seal carried by a distal end of the annular flange.

6. The filter element as in claim 1, wherein the annular flange includes first and second branches defining an outwardly-opening seal channel therebetween, a radially inner of the two branches including the threaded portion, and the open end of the housing attached to an outer one of the two branches.

7. The filter element as in claim 6, wherein the open end of the housing is mechanically formed around the outer of the two branches.

8. The filter element as in claim 6, and further including an annular seal located in the seal channel.

9. The filter element as in claim 1, wherein the generally radially extending openings in the annular flange comprise circular passages.

10. A filter head, comprising:
a body with an inlet and an outlet, a first chamber defined in said body in fluid communication with said inlet, a second chamber defined in said body in communication with said first chamber, and a third chamber defined in said body in communication with said second chamber, a first valve seat between said first and second chambers, and a second valve seat defined between said second and third chambers, a first spring-biased check valve located between said first and second chambers, and operable to allow fluid to flow from said first chamber to said second chamber, and to prevent fluid flow from said second to said first chamber; a second spring-biased check valve located between said second and third chambers, and operable to allow fluid to flow from said second to said third chamber, and to prevent fluid flow from said third to said second chamber, a priming pump integral with said body and operable to alternatingly create fluid pressure and vacuum in said second chamber when operated, whereby fluid vacuum in said second chamber causes fluid to flow from said inlet into said first chamber and then into said second chamber, and fluid pressure in said second chamber causes fluid to flow from said second chamber to said third chamber, and wherein at least one of said check valves includes a central cylindrical body having a head end and a base end, an annular valve retainer located around the cylindrical body and received in and secured to the respective valve seat, and a spring extending between the base end and the retainer, and urging the head end into a closed position to normally close a flow path through the check valve.

11. The filter head as in claim 10, wherein each of the check valves include a cylindrical body having a head end and a base end, an annular valve retainer located around the cylindrical body and received in and secured to the respective valve seat, and a spring extending between the base end and the retainer, and urging the head end against the retainer to normally close a flow path through the check valve.

12. The filter head as in claim 10, wherein the cylindrical body moves in an axial direction perpendicular to the respective valve seat between an open position when the head end is spaced away from the respective valve seat, and a closed position where the head end is in sealing contact with the respective valve seat.

13. The filter head as in claim 10, wherein the cylindrical body is surrounded by and extends through an opening defined by the respective valve seat, with the base end located on an opposite side of the respective valve seat from the head end.

14. The filter head as in claim 10, wherein the valve retainer is press-fit in the respective valve seat and surrounds the cylindrical body.

15. The filter head as in claim 10, wherein the head end and the base end are integral with and annularly surround the cylindrical body, and project radially outward from the cylindrical body at opposite ends of the cylindrical body, and the valve retainer is located between the head end and the base end and surrounds the cylindrical body, and the cylindrical body moves between an open and closed position relative to the valve retainer.

16. A filter head, comprising:
a body with an inlet and an outlet, a heater chamber defined in said body fluidly connected to said inlet, and a heater assembly located in said heater chamber, said heater assembly including a heater element and an electrical connector with said heater element enabling remote operation of said heater element, a heater pan enclosing the heater element in the heater chamber, the heater pan including a central cup-shaped nipple portion extending outward from the heater chamber and away from the body, said nipple portion having a flow opening, and a valve element located in the nipple portion and normally biased against the flow opening to prevent flow through the nipple portion.

17. The filter head as in claim 16, wherein said heater pan includes a cut-out portion allowing fluid flow out from the heater chamber.

18. The filter head as in claim 16, wherein said heater pan is non-conductive.

19. The filter head as in claim 16, wherein the heater pan includes a flat body closely received within the heater chamber, and the nipple portion is formed unitary with the flat body of the heater pan.

20. The filter head as in claim 19, wherein the nipple portion has a smooth, cylindrical outer wall terminating in a radially-inward directed annular flange defining a circular flow opening.

21. The filter head as in claim 16, wherein the heater element comprises a pair of flat heater discs, interposed between a pair of C-shaped flat heat sinks.

22. The filter head as in claim 20, wherein the valve element is a spherical valve element, and a spring biases the spherical valve element against the flow opening.

23. A filter head assembly, comprising:

a body with an inlet and an outlet, a first chamber defined in said body in fluid communication with said inlet, a second chamber defined in said body in communication with said first chamber, and a third chamber defined in said body in communication with said second chamber, an annular flange projecting away from said filter head and surrounding said third chamber, said annular flange including a threaded portion, a first valve seat between said first and second chambers, and a second valve seat defined between said second and third chambers, a first spring-biased check valve located between said first and second chambers, and operable to allow fluid to flow from said first chamber to said second chamber, and to prevent fluid flow from said second chamber to said first chamber; a second spring-biased check valve located between said second and third chambers, and operable to allow fluid to flow from said second to said third chamber, and to prevent fluid flow from said third to said second chamber, a priming pump integral with said body and manually operable to alternatingly create fluid pressure and vacuum in said second chamber when manually operated, whereby fluid vacuum in said first chamber causes fluid to flow from said inlet into said first chamber and then into said second chamber, and fluid pressure in said second chamber causes fluid to flow from said second chamber to said third chamber, and wherein at least one of said check valves includes a cylindrical body having a head end and a base end, an annular valve retainer located around the cylindrical body and received in and secured to the respective valve seat, and a spring extending between the base end and the retainer, and urging the head end against the retainer to normally close a flow path through the check valve; and a heater assembly located in said third chamber, said heater assembly including a heater plate and an electrical connector with said heater plate enabling remote operation of said heater plate, a heater pan enclosing the heater plate in the third chamber, the heater pan including a central cup-shaped nipple portion extending outward from the heater chamber and away from the body, said nipple portion having a flow opening, and a valve element located in the nipple portion and normally biased against the flow opening to prevent flow through the nipple portion.

24. The filter head as in claim 23, wherein said heater pan includes a cut-out portion allowing fluid flow out from the heater chamber.

25. The filter head as in claim 23, wherein said heater pan is non-conductive.

26. The filter head as in claim 23, wherein the heater pan includes a flat body closely received in the third chamber, and the nipple portion is formed unitary with the flat body of the valve pan.

27. The filter head as in claim 26, wherein the nipple portion has a smooth, cylindrical outer wall terminating in a radially-inward directed annular flange defining a circular flow opening.

28. The filter head as in claim 23, wherein the valve element is a spherical valve element, and a spring biases the spherical valve element against the flow opening.

29. A filter assembly, comprising:

a filter head and a removable filter element, said filter head including a body with an inlet and an outlet, a first chamber defined in said body in fluid communication with said inlet, a second chamber defined in said body in communication with said first chamber, and a third chamber defined in said body in communication with said second chamber and said filter element, an annular flange projecting away from said filter head and surrounding said third chamber, said annular flange including a threaded portion, a first valve seat between said first and second chambers, and a second valve seat defined between said second and third chambers, a first spring-biased check valve located between said first and second chambers, and operable to allow fluid to flow from said first chamber to said second chamber, and to prevent fluid flow from said second chamber to said first chamber; a second spring-biased check valve located between said second and third chambers, and operable to allow fluid to flow from said second to said third chamber, and to prevent fluid flow from said third to said second chamber, a priming pump integral with said body and manually operable to alternatingly create fluid pressure and vacuum in said second chamber when manually operated, whereby fluid vacuum in said first chamber causes fluid to flow from said inlet into said first chamber and then into said second chamber, and fluid pressure in said second chamber causes fluid to flow from said second chamber to said third chamber and to said element, and wherein at least one of said check valves includes a cylindrical body having a head end and a base end, an annular valve retainer located around the cylindrical body and received in and secured to the respective valve seat, and a spring extending between the base end and the retainer, and urging the head end against the retainer to normally close a flow path through the check valve;

a heater assembly located in said third chamber, said heater assembly including a heater plate and an electrical connector with said heater plate enabling remote operation of said heater plate, a heater pan enclosing the heater plate in the third chamber, the heater pan including a central cup-shaped nipple portion extending outward from the heater chamber and away from the body toward the filter element, said nipple portion having a flow opening, and a valve element located in the nipple portion and normally biased against the flow opening to prevent flow through the nipple portion; and said filter element including a ring-shaped filter media circumscribing a central axis and having first and second ends, a housing receiving said filter media ring, said housing including a closed end and an open end, the first end of the filter media ring being located toward the open end of the housing, and the second end of the filter media ring being located toward the closed end of the housing, and an end cap attached to the first end of the filter media ring, the end cap including an annular body portion bonded to the filter media ring, and an annular flange unitary with the annular body portion and extending axially outward away from the end cap, and located toward the periphery of the end cap, said annular flange including a threaded portion to enable the filter element to be removeably connected to the annular threaded flange portion of the filter head, and generally radially-extending openings in the annular flange of the end cap between the threaded portion and the annular body portion to enable fluid flow through the annular flange of the end cap, and a central portion spanning the annular body portion and having flow openings to enable flow through the central portion to the outlet, said central portion supporting a central projection, said central projection having a base end supported interiorly of the media ring and located away from said end cap and extending axially from said base end to a distal end located toward the end cap, said central projection engaging the valve element and maintaining the valve element in an open position to allow fluid flow from the inlet of the filter head to the outlet of the filter head.

* * * * *